United States Patent
Pires Dos Reis Moreira et al.

(10) Patent No.: US 12,283,100 B2
(45) Date of Patent: Apr. 22, 2025

(54) IMAGE CLASSIFICATION IN A SEQUENCE OF FRAMES

(71) Applicant: Snap Inc., Santa Monica, CA (US)

(72) Inventors: Orlando Miguel Pires Dos Reis Moreira, Eindhoven (NL); Louis Rouillard-Odera, Paris (FR)

(73) Assignee: Snap Inc., Santa Monica, CA (US)

( * ) Notice: Subject to any disclaimer, the term of this patent is extended or adjusted under 35 U.S.C. 154(b) by 371 days.

(21) Appl. No.: 17/630,250

(22) PCT Filed: Sep. 4, 2020

(86) PCT No.: PCT/EP2020/074845
§ 371 (c)(1),
(2) Date: Jan. 26, 2022

(87) PCT Pub. No.: WO2021/044021
PCT Pub. Date: Mar. 11, 2021

(65) Prior Publication Data
US 2022/0254135 A1   Aug. 11, 2022

(30) Foreign Application Priority Data
Sep. 6, 2019 (EP) .................................... 19195984

(51) Int. Cl.
*G06V 20/40*   (2022.01)
*G06T 3/40*    (2024.01)
(Continued)

(52) U.S. Cl.
CPC ................ *G06V 20/40* (2022.01); *G06T 3/40* (2013.01); *G06V 10/25* (2022.01); *G06V 10/74* (2022.01);
(Continued)

(58) Field of Classification Search
CPC ........ G06V 20/40; G06V 10/25; G06V 10/74; G06V 10/763; G06V 10/764; G06V 10/80; G06T 3/40
See application file for complete search history.

(56) References Cited

U.S. PATENT DOCUMENTS

| | | | |
|---|---|---|---|
| 2018/0053393 A1* | 2/2018 | White | A61B 5/1128 |
| 2019/0034734 A1 | 1/2019 | Yen et al. | |
| 2019/0114804 A1 | 4/2019 | Sundaresan et al. | |

FOREIGN PATENT DOCUMENTS

| | | |
|---|---|---|
| EP | 3789909 A1 | 3/2021 |
| EP | 4026045 A1 | 7/2022 |
| WO | WO-2021044021 A1 | 3/2021 |

OTHER PUBLICATIONS

"European Application Serial No. 19195984.0, Extended European Search Report mailed Mar. 17, 2020", 10 pgs.
(Continued)

*Primary Examiner* — Casey L Kretzer
(74) *Attorney, Agent, or Firm* — Schwegman Lundberg & Woessner, P.A.

(57) ABSTRACT

A method and system for classifying image content in a sequence (SEQ) of image frames. Frame image data (FI), representing an appearance of image content of the image frames (Fm,Fn), is converted into frame event data (FEn). The conversion comprises determining, for each event, a set of event parameters. The event parameters include positional coordinates (x,y) representing a corresponding position of the respective image content in the frame image data (FI) having changed value between different image frames (Fm,Fn) in the sequence (SEQ). The event parameters of the frame event data (FEn) are processed, preferably by clustering, to determine at least one event-based region of interest (R1) in the sequence (SEQ) of image frames. At least one classification (C1) is calculated based on an
(Continued)

intersection of the event-based region of interest (R1) with the frame image data (FI) of an image frame (Fn) in the sequence (SEQ).

20 Claims, 6 Drawing Sheets

(51) Int. Cl.
    *G06V 10/25*     (2022.01)
    *G06V 10/74*     (2022.01)
    *G06V 10/762*     (2022.01)
    *G06V 10/764*     (2022.01)
    *G06V 10/80*     (2022.01)

(52) U.S. Cl.
    CPC .......... *G06V 10/763* (2022.01); *G06V 10/764* (2022.01); *G06V 10/80* (2022.01)

(56) References Cited

OTHER PUBLICATIONS

"European Application Serial No. 19195984.0, Noting of loss of rights pursuant to Rule 112(1) EPC mailed Oct. 1, 2021", 2 pgs.

"European Application Serial No. 20764686.0, Response to Communication pursuant to Rules 161(1) and 162 EPC filed Oct. 20, 2022", 7 pgs.

"International Application Serial No. PCT/EP2020/074845, International Preliminary Report on Patentability mailed Mar. 17, 2022", 8 pgs.

"International Application Serial No. PCT/EP2020/074845, Written Opinion mailed Nov. 18, 2020", 6 pgs.

European Patent Office, International Search Report in corresponding International Application No. PCT/EP2020/074845, dated Nov. 18, 2020 (3 pages).

Deng et al., "NeTra-V: Toward an Object-Based Video Representation," IEEE Transactions on Circuits and Systems for Video Technology, vol. 8, No. 5, pp. 616-627, XP-000779458 (Sep. 1998).

Ren et al., "State-of-the-art on spatio-temporal information-based video retrieval," Pattern Recognition, vol. 42 (2009), No. 2, pp. 267-282, XP055003742.

"European Application Serial No. 20764686.0, Communication Pursuant to Article 94(3) EPC mailed Mar. 14, 2024", 7 pgs.

"European Application Serial No. 20764686.0, Response filed Sep. 3, 2024 to Communication Pursuant to Article 94(3) EPC mailed Mar. 14, 2024", 20 pgs.

\* cited by examiner

FIG 6D

IMAGE CLASSIFICATION IN A SEQUENCE OF FRAMES

CROSS-REFERENCE TO RELATED APPLICATIONS

This patent application is a U.S. National Phase of PCT International Application No. PCT/EP2020/074845, filed Sep. 4, 2020, which claims priority to European Application No. 19195984.0, filed Sep. 6, 2019, which are both expressly incorporated by reference in their entireties, including any references contained therein.

TECHNICAL FIELD AND BACKGROUND

The present disclosure relates to computer-implemented methods and systems for classifying image content in a sequence of image frames.

Neural network systems, e.g. based on deep learning algorithms, are becoming increasingly capable of classifying image content. For example, a neural network can be trained to recognize and classify objects based on the pixel values of an image frame. However, the classification of an image can require significant computing resources, e.g. processing time and memory. This can be especially the case when the number of pixels is large such as in high-resolution imagery. Even more resources may be needed for classification of content in a sequence of images. For example, a standard (frame-based) cameras can be used to record a series of image frames representing a time dependent progression of a scene. Each image frame may consist of many pixel values, some of which may be static while others may change between the frames, e.g. as objects can move or otherwise change appearance. One way to reduce resource usage may be to downscale the image resolution. However, this can also reduce the information which may be needed to classify the image content. Another way to reduce resource usage may be to focus the processing on a specific region of interest, e.g. a smaller sub-portion of the whole image. However, determining where the region of interest should be located may itself require substantial processing.

There remains a need for improvements in efficiency and accuracy of real-time classification of image content, e.g. in a sequence of high-resolution image frames.

SUMMARY

Some aspects of the present disclosure relate to methods and systems for classifying image content in a sequence of image frames. Frame event data can be determined based on a comparison between frame image data representing respective image content of at least two different image frames in the sequence. For example, the pixel based image data can be converted to a set events representing (threshold) changes in a subset of the original pixels. The frame event data, e.g. coordinates and other event parameters defining the event, can be processed to determine at least one event-based region of interest in the sequence of image frames. One or more classification can be calculated based on an intersection of the event-based region of interest with the frame image data of an image frame in the sequence.

It will be appreciated that, while each image frame may comprise image data consisting of many respective pixel values, the frame event data can be relatively sparse, e.g. tracking only respective positions where significant change has occurred between subsequent image frames. Accordingly, the amount of data to be processed for determining a region of interest can be reduced. Furthermore, by focusing the processing on the changes between image frames, regions of moving or changing objects can be readily identified. The identified region in the event data can be correlated to a corresponding region in the image data of one or more of the frames. The reduced number of pixels in the corresponding region of interest can then be used to determine a respective classification which may be characteristic of the object or scene.

Further reduction of resource usage may result from downscaling of the image frames used in the comparison. For example, the number of pixels to process for comparison between the downscaled images may be relatively low. Furthermore, the buffering of one or more previous images may take relatively less memory. While the region of interest may be identified using downscaled images, the location of this region can be subsequently used to select pixels in the full image frame. Accordingly, an improvement in resource efficiency may be achieved without sacrificing information of the original image.

By separately scaling identified regions of interest which are clipped from the full image frame, the information contents of the region for subsequent processing can be independent from the process for identifying the region. For example, in a high-resolution image, the regions of interest may be scaled to a uniform size, for uniform processing. The subsequent processing may also involve converting the region of interest to respective event data. For example, the pixels in an identified region of interest may be compared between different frames. The combined features may provide synergetic advantages of event-based processing efficiency retaining variable levels of information provided in high-resolution frame-based data.

Other or further aspects relate to methods and systems for classifying event data. The event data can be processed to determine at least one region of interest. Preferably, the processing includes determining one or more clusters of events. By clustering events based on their relative proximity in position and time, moving objects may be better tracked while spurious events can be reduced. For example, a region of interest can be determined based on a shape fitted to a respective cluster of events. Region event data can be determined based on the region of interest. One or more classifications can be calculated based on the region event data. For example, a bounding box or other shape is fitted to envelop at least a majority of the events in a respective cluster. For example, events within the region of interest may be processed for calculating the classification. The event data can be determined based on a comparison of frame image data representing image content of respective frames in a sequence of image frame. Alternatively, or additionally it can also be envisaged that the events are generated by an event-based sensor.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise, it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1:
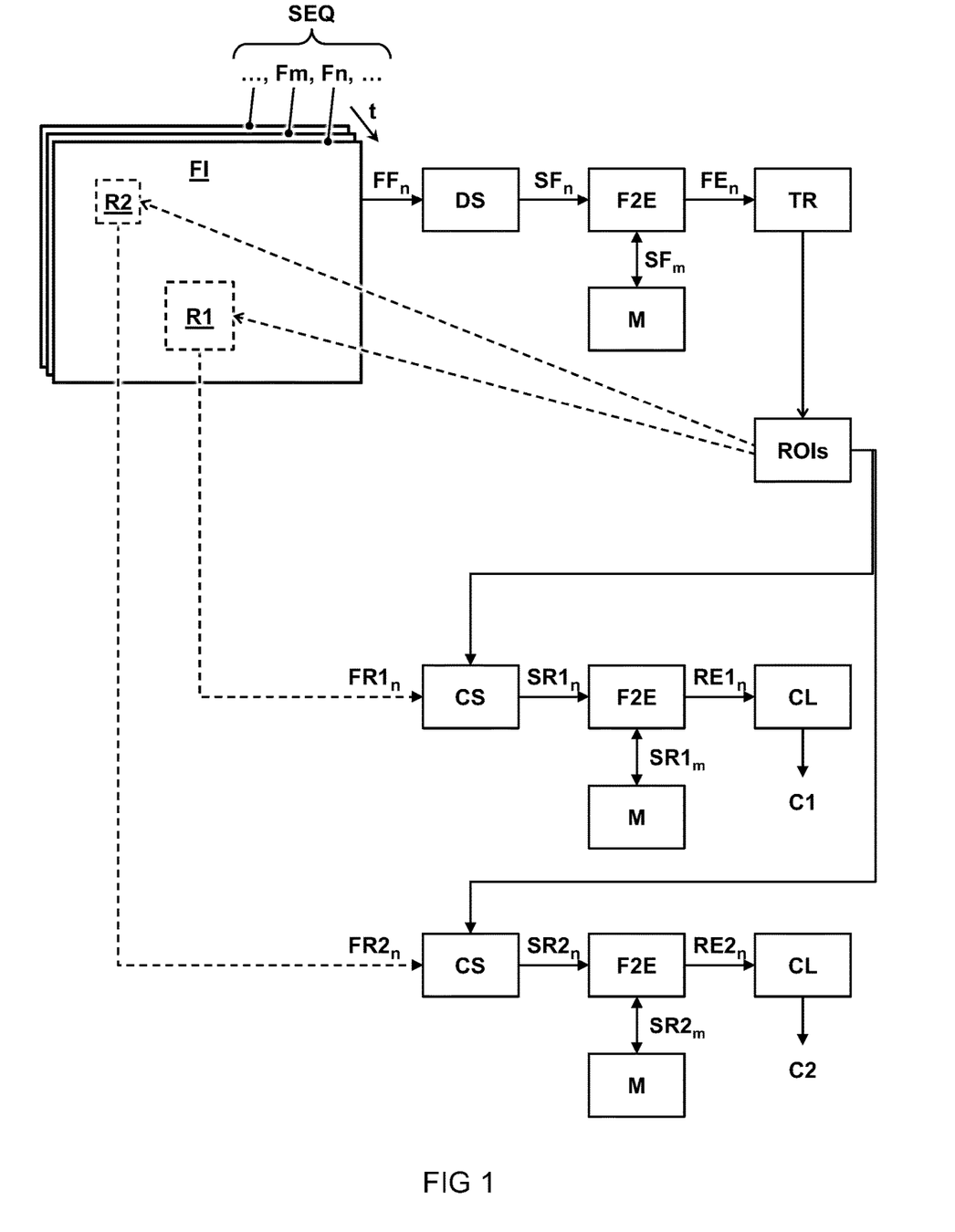
FIG. 1 illustrates determining event-based regions of interest for classification of image content in a sequence of image frames.

FIG. 1 illustrates determining event-based regions of interest R1, R2 for classification C1, C2 of image content in a sequence SEQ of image frames Fm,Fn.

In some embodiments a system or (computer-implemented) method is provided for classifying image content in a sequence SEQ of image frames. In one embodiment, frame event data FEn is determined based on a comparison between frame image data FI representing respective image content of at least two different image frames Fm,Fn in the sequence SEQ.

In some embodiments, the frame image data FI is converted into frame event data FEn. For example, the frame image data represents an appearance of respective image content of the image frames, e.g. defining the values of pixels in one or more channels of a full or scaled image. This may be contrasted with frame event data, e.g. defined by a set of events which can be more sparse and thus requires less memory/data/processing. In one embodiment, an event is determined, e.g. generated and/or stored in memory, for each pixel (or subset/combination of pixels), whose value in one or more channels (e.g. RGB or other representation) has changed more than a threshold amount between one image frame to one or more other, e.g. subsequent, image frame(s). Accordingly, pixels that have not changed more than a threshold amount can be omitted from the event data.

In one embodiment, the conversion comprises determining, for each event, a set of event parameters. For example, the conversion of frame image data to frame event data comprises processing the image data and based on the processing, determining a set of events, wherein for each event one or more event parameters are stored, e.g. in a table or other memory structure. Preferably, the event parameters include at least a set of positional coordinates (x,y) representing a corresponding position of a change of the image content, e.g. pixel coordinates. For example, the change can be determined by comparing the image content, e.g. pixels, in at least two different image frames. Also other or further parameters can be generated and/or recorded for each event, such as a time (stamp) at which the respective event has occurred. In some embodiments, the event parameters comprise a respective value representing the change between the frame image data of at least two different image frames in the sequence. For example, the value comprises a direction, e.g. polarity (+/−), and/or amount of change of a pixel in the (full or downscaled) image frame.

In some embodiments, the frame event data FEn is processed to determine at least one event-based region of interest R1 in the sequence SEQ of image frames. In one embodiment, the event parameters, are processed to determine at least one event-based region of interest in the sequence of image frames. For example, the events can be clustered according to their position, time, and/or value, to determine positional and/or temporal coordinates of a region of interest, e.g. shape, encompassing the cluster of events. In another or further embodiment, at least one classification C1 is calculated based on an intersection of the event-based region of interest R1 with the frame image data FI of an image frame Fn in the sequence SEQ.

In one embodiment, the event-based region of interest R1 is intersected with one or more of the image frames (e.g. Fm and/or Fn) in the sequence SEQ from which frames the events FEn were derived. In another or further embodiment, the event-based region of interest R1 is intersected with one or more other frames in the sequence SEQ, i.e. other than the image frames Fm, Fn from which the respective frame event data FEn is derived. For example, a position of the region of interest R1 can be extrapolated to a future frame. In a preferred embodiment, an event-based region of interest R1, that is based on a first set of frames (e.g. Fm and Fn), is intersected with one or more other frames that succeed (follow in time after) the first set of frames. For example, this may allow stream processing and/or avoid intermediate storage of full frames. Also combinations are possible. In some embodiments, a position of the region of interest is interpolated and/or extrapolated. For example, extrapolation can be used to correct a region of interest when applied to image frame that come in the future.

Some embodiments comprise receiving a current full frame FFn of the sequence SEQ of image frames and downscaling the current full frame FFn to generate a current scaled frame SFn. Other or further embodiments comprise comparing the current scaled frame SFn to a previous scaled frame SFm to generate the frame event data FEn. In some embodiments, the current scaled frame SFn is compared to a previous scaled frame SFm to determine the positional coordinates and values of the events in the frame event data FEn. Preferably, the positional coordinates of events based on the scaled frames are matched to corresponding (pixel) coordinates of the full frames to determine the at least one event-based region of interest R1 in the frame image data FI of the current full frame FFn. For example, the coordinates of pixels in the downscaled frames are scaled or rescaled to determine corresponding coordinates in the full frames, or respective pixels in the downscaled frames maintain the pixels coordinates of the corresponding pixels of the full frames from which they are derived.

In one embodiment, e.g. as shown, a first full frame FFm is received by a down-scaler DS to generate a first scaled frame SF. In another or further embodiment, a second full frame FFn is received by the down-scaler DS to generate a second scaled frame SFn. In some embodiments, the first scaled frame can be stored in a memory M, for comparison to the subsequent second scaled frame. For example, downscaling may comprise combining multiple pixels in a full image to generate a respective one pixel in a downscaled image. For example, pixel values of the multiple pixels may be averaged or otherwise combined to produce the downscaled image. Also, other methods of downscaling can be envisaged, e.g. simply keeping only a fraction of the pixels in the scaled version. In a preferred embodiment, e.g. as shown, a (first) frame-to-event converter (F2E) is used to compare sequential frames. In one embodiment, e.g. as shown, the first frame-to-event converter is configured to compare the second scaled frame SFn to the first scaled frame SFm, for generating frame event data FEn.

In some embodiments, frame event data FEn is received by a tracker TR, e.g. object tracker. With regards at least some aspects described herein with respect to the tracker, it will be understood that the input frame event data FEn can be generated e.g. based on comparison of image frames Fm,Fn, as described herein; or generated in any other way, e.g. from an event based sensor (not shown). In one embodiment, the tracker TR is configured to determine one or more regions of interest ROIs, which can then be overlapped with corresponding regions R1, R2 in one or more image frames Fm, Fn in the sequence SEQ. In another or further embodiment, the tracker TR is configured to track one or more regions of interest between frames. In some embodiments, the tracker TR is configured to extrapolate a (changing) position of the region of interest from the frame event data (FEn) of previous frames Fm,Fn, to determine the position in one or more current or future frames. For example, the tracker TR is configured to determine a trajectory of the position and/or extent of one or more regions of interest over a sequence of frames.

In a preferred embodiment, the event-based region of interest R1 is based on comparison of downscaled image frames SFm, SFn of respective full image frames FFm, FFn, wherein the classification C1 is calculated based on pixel values of at least one of the full image frames FFn in a correspondingly scaled region of interest R1. In other words, the region of interest may be determined based on downscales images, i.e. having reduced number of pixels, while actual classification may be based on applying the region of interest to the full image, i.e. having more pixels and thus more information content.

Some embodiments comprise retrieving a current full region FR1n from the current full frame FFn based on the determined region of interest R1. Other or further embodiments comprise scaling the current full region FR1n to generate a current scaled region SR1n. Other or further embodiments comprise calculating a classification of the region of interest R1 based on the current scaled region SR1n.

In some embodiments, a region of interest is extracted by copying and/or clipping part of the frame image data FI. Optionally, the clipped region of interest can be scaled. In one embodiment, e.g. as shown, a clip and scale unit CS is used to retrieve a respective region of interest R1, R2 from the frame image data FI of a full frame. In some embodiments, the unit CS is configured to clip part of the image data in a bounding box with coordinates defined by the respective region of interest R1, R2. While the present figure shows a rectangular or square bounding box, also other shapes, e.g. circular or elliptical can be used. In other or further embodiments, the unit CS is configured to scale the clipped region, e.g. to improve uniformity in the number of pixels for further processing. For example, when the clipped region is relatively large, it can be downscaled to reduce the number of pixels; or when the clipped region is relatively small, it can be upscaled (which may not be necessary for sufficient high-resolution images). It can also be envisaged to append neighboring pixels to increase the region size. Most preferably, each scaled region SR1n, SR2n has the same number of pixels.

Some embodiments comprise retrieving a current full region FR1n from the current full frame FFn based on the determined region of interest R1. Other or further embodiments comprise scaling the current full region FR1n to generate a current scaled region SR1n. Other or further embodiments comprise comparing the current scaled region SR1n to a previous scaled region SR1m to generate region event data RE1n. Other or further embodiments comprise calculating a classification of the region of interest R1 based on the region event data RE1n.

In some embodiments, a second or further frame-to-event converter (F2E) is used to compare clipped and/or scaled regions SRm, SRn of subsequent (full) frames to generate respective region event data RE1n, RE2n. For example, the region event data may be processed by an event-based classifier CL. In another embodiment (not shown) it can also be envisaged to directly classify image content of the region of interest in the full image frame, or a scaled version of that region. In one embodiment, the frame-to-event converter is configured to store a previous one ore more scaled regions SR1m in a memory for comparison to a subsequent scaled region SR1n.

In some embodiments, the frame-to-event converters (F2E) used for determining the region event data RE1n may be similar or the same as that used for determining the frame event data FEn. The respective memories M may also be similar, e.g. having the same size, or having different sizes. As will be appreciated, the respective sizes of the scaled frames SF, and scaled regions may be separately adaptable to respectively optimize the identification and/or tracking of regions of interest; and classification of the image content in those regions.

In some embodiments, the output of one or more of the frame-to-event converters may be binary, e.g. to indicate that a change has (or has not) occurred for a specific sensor element, e.g. pixel. For example, the converter may output a pulse (binary value "one") for a respective sensor element only when it has registered an event, and not output anything (binary value "zero") when there is insufficient change. Alternatively, or additionally the sensor output or network input may include another (non-binary) numerical value indicating, e.g. the amount and/or type of change which was registered. This and other information may also be encoded e.g. as a combination of binary outputs in one or more output channels per respective sensor element.

In some embodiments, regions of interest may be identified and/or tracked between frames. For example, the tracker TR is configured to retain information of previous regions or events, to determine a current region of interest. For example, there may be correlations in time and/or place between respective events and/or regions of interest in different frames as will be further discussed below.

In some embodiments, a neural network (not shown) is used to classify either the image data of the frame, e.g. pixels, or event data derived from a frame-to-event converter, or directly from an event-based sensor. Neural networks are computing systems which may serve as a framework for many different machine learning algorithms to process complex data inputs. Such systems may "learn" to perform tasks by considering examples, generally without being programmed with any task-specific rules. A neural network is based on a collection of connected units or nodes called neurons. Each connection can transmit a signal from one neuron to another. A neuron that receives a signal can process it and then signal additional neurons connected to it. The output of each neuron is typically computed by some non-linear function of the sum of its inputs. The connections can have respective weights that adjusts as learning proceeds. There may also be other parameters such as biases. Typically, the neurons are aggregated into layers. Different layers may perform different kinds of transformations on their inputs to form a deep neural network.

Various types of neural networks can be envisaged. For example, a spiking neural network can be used to classify event data. In some embodiments, the network includes one or more neurons whose output changes as a function of time, e.g. a time period since the respective neuron was triggered. In other words, the output of the neuron may be different at different times depending when its output is requested, e.g. triggered by a subsequent event. This may also be referred to as a time-dependent or temporal neuron. The presence of time-dependent neurons in the network may be advantageous e.g. where the classification depends on the timing between different events. Also, other applications may be envisaged.

In some embodiments, the calculation involves a time response function which takes a time stamp of the current event as input and calculates the current output value of a previously triggered neuron. In other or further embodiments, the calculation may depend on one or more previous received input values corresponding to one or more previous events. For example, the current output value is determined by a previously input corresponding to a previous event and a previous time stamp with a time difference with the time stamp of the current event.

In one embodiment, a system for classifying a sequence of events comprises a sensor device configured to register sensor data, e.g. frame image data or event-based sensor data. In another or further embodiment, the system comprise a neural network configured (and/or programmed) to receive the sensor data from the sensor or intermediate devices (e.g. the frame-to-event converters). In some embodiments, the neural network is configured to process the sensor data to calculate one or more classification values representing a respective classification of the recorded image and/or events.

Based on the series of events output from the converters (or registered by the sensor device), the neural network may classify the series of events, e.g. calculate a probability that the registered series of events, belongs to one (or more) of multiple classifications. For example, the probability for a respective classification may be determined as a (relative) output value from a respective neuron in the output layer, associated with that classification. In some embodiments, the classifications may be predetermined, and the neural network may be trained to recognize the classifications. In other embodiments, the neural network may itself determine a set of classifications that may then be labelled (unsupervised learning).

The classification values may serve as input to further system components e.g. in an autonomous system which may take action or present options based on the classification. The classification values may also be simply output to a user interface reporting the event. In some embodiments, classification of a series of events may include classification of a type of movement or a direction of movement. For example, in an autonomous driving system, various maneuvers of other cars may be classified such as: accelerating, decelerating, turning left/right, et cetera. Of course, the classifications may depend on the application of the system Typically, a neural network, comprises a plurality of neurons. In a preferred embodiment, the neurons are distributed over multiple layers, e.g. to form a deep neural network. Typically, such layers include an input layer, an output layer, and one or more hidden layers there between. For example, classification of events may comprise calculating output values of neurons in the output layer which may be based on a series of input values corresponding to a frame image data and/or respective sequence of events and at different instances of time In one embodiment, the neural network comprises an input layer with neurons configured to receive input values corresponding to the frame image data and/or sequence of events. In some embodiments, the input values may include a respective time stamps indicating when the respective event was triggered, e.g. at what time the event was registered by a sensor or which frame.

In some embodiments, interconnections between the neurons are formed exclusively across subsequent layers, e.g. between the input layer and the first hidden layer, between the first hidden layer, and the second hidden layer, et cetera, up to the last hidden layer and the output layer. Also, other configurations of networks and connections may be envisaged.

In one embodiment, a method for classifying events comprises applying network input values associated with a sequence of events to respective neurons at an input layer of a neural network; and calculating network output values of respective neurons at an output layer of the neural network, wherein the network output values determine a classification of the sequence of events.

Figure 2:
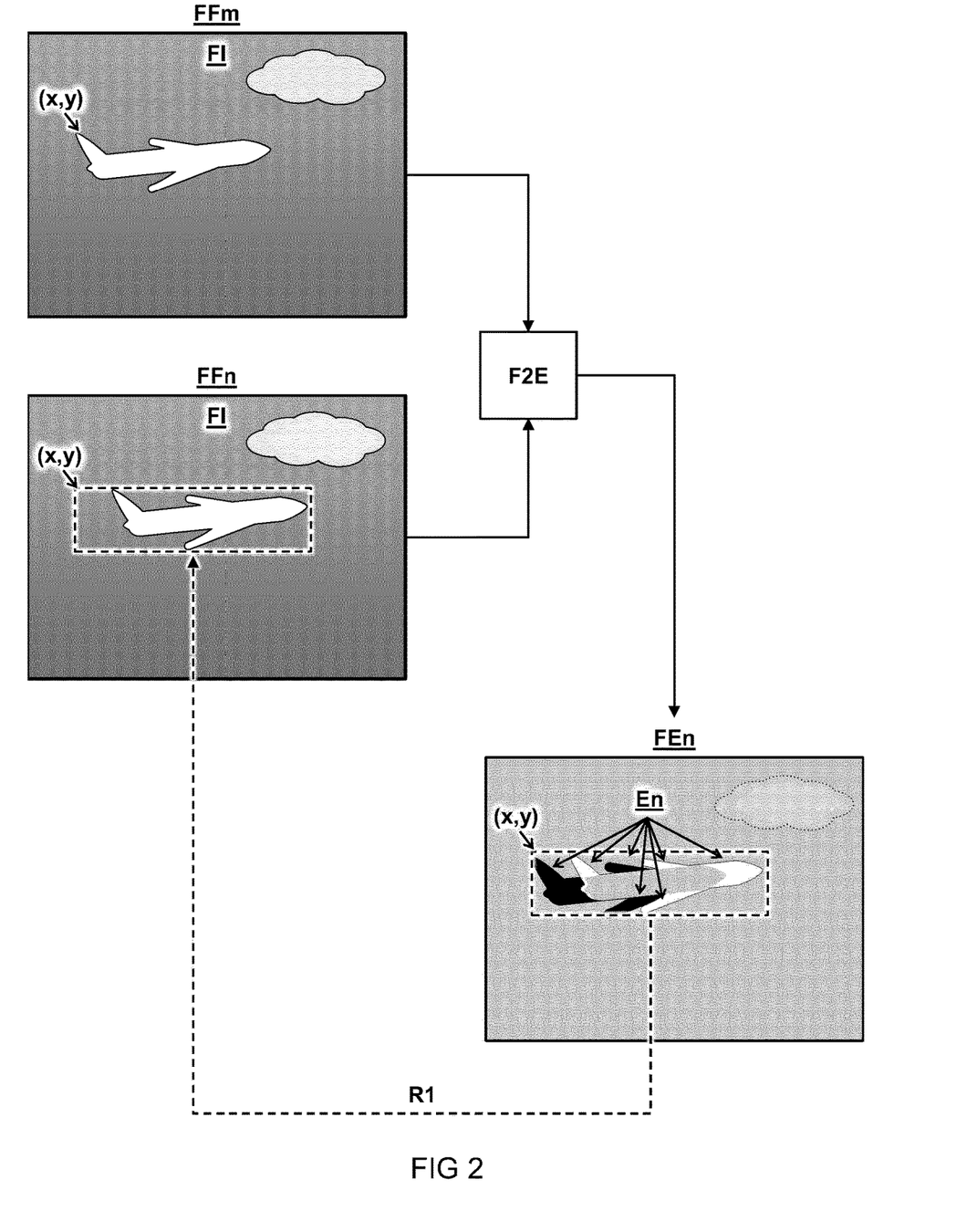
FIG. 2 illustrates a frame-to-event converter generating frame event data based on comparison of frame image data in respective frames.

FIG. 2 illustrates a frame-to-event converter F2E generating frame event data FEn based on comparison of frame image data FI in respective frames FFm, FFn;

Typically, the frame image data FI comprises information determining an appearance of each pixel in the (full or scaled) frame. For example, each pixel may be defined including respective values for one or more channels, e.g. gray scale and/or color channels. In some embodiments, the frame image data FI comprises image content representing one or more objects to be classified. The objects may be moving/changing, or static. In the example images, the image content comprises an airplane moving across the sky. Furthermore, the image content comprises a cloud which may be relatively unchanged between frames. Of course, respective change may depend on the time scale. For example, the timescale in which the airplane moves through the frame may be must shorter than the timescale in which the cloud moves or changes shape.

Typically, the frame event data FEn comprises a set of one or more events En. The number of events may be different—typically less—than the number of pixels. For example, not each pixel may generate an event, e.g. depending on a threshold. For example, each event E may be derived from the comparison of respective pixels values in subsequent image frames FFm, FFn. Various aspects of the pixel values can be used to determine an event. For example, a difference in pixel luminosity and/or color can be used to generate an event. Each pair of pixels can be used to generate one or more events, e.g. in different color channels (e.g. RGB, HSV, YUV, etc.). For example, a respective event can be generated for one or more channels in an HSV color space, e.g. when a respective change in a channel exceeds a predetermined threshold. Also, more than two frames can be used to determine a respective event.

In one embodiment, an event E may be defined including a set of positional coordinates (x, y), which may correspond to the respective location of the pixels in the image frame used to derive the event. In another or further embodiment, an event E may be defined including a temporal coordinate (t), which may correspond e.g. to a respective time stamp of one or both of the image frames used for the comparison, or e.g. a respective frame number. In another or further embodiment, an event E may be defined including a respective value (v) indicating e.g. the amount of change and/or a direction of the change (polarity), e.g. increase or decrease in hue (color value), saturation, and/or value (intensity). For example, an event can be stored by storing a set of positional coordinates (x,y) of the event and a temporal coordinate or timestamp (t) when the event has occurred. Furthermore, the amount (v) and/or direction of change of an event can be stored as part of the event.

Figure 3:
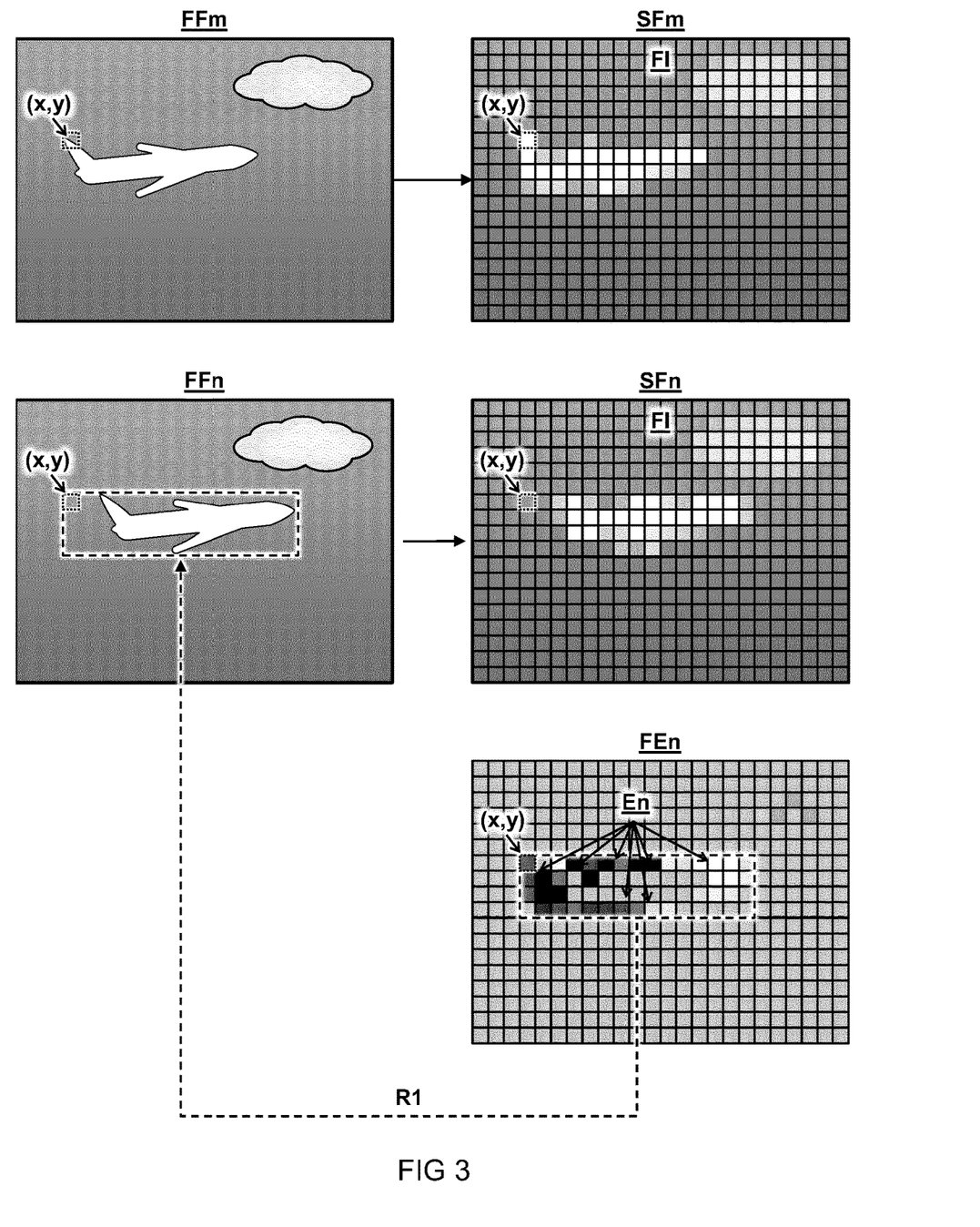
FIG. 3 illustrates generating frame event data based on comparison of frame image data in respective scaled frames.

FIG. 3 illustrates generating frame event data FEn based on comparison of frame image data FI in respective scaled frames SFm, SFn. In the embodiment shown, a first full frame FFm is downscaled to generate a first scaled frame SFm; and a second full frame FFn is downscaled to generate a second scaled frame SFn. In a preferred embodiment, a reduced number of pixels in respective scale frames SFm, SFn is compared to generate frame event data FEn. For example, the frame event data FEn includes events En for respective pixels exhibiting threshold change between the scaled frames SFm, SFn. In a preferred embodiment, coordinates (x,y) of the events En are correlated with a known relation to coordinates (x,y) in a respective full frame FFn. Accordingly, the coordinates of a region of interest R1 determined on the basis of the frame event data FEn can be correlated to corresponding coordinates in the respective full frame FFn.

Figure 4A:
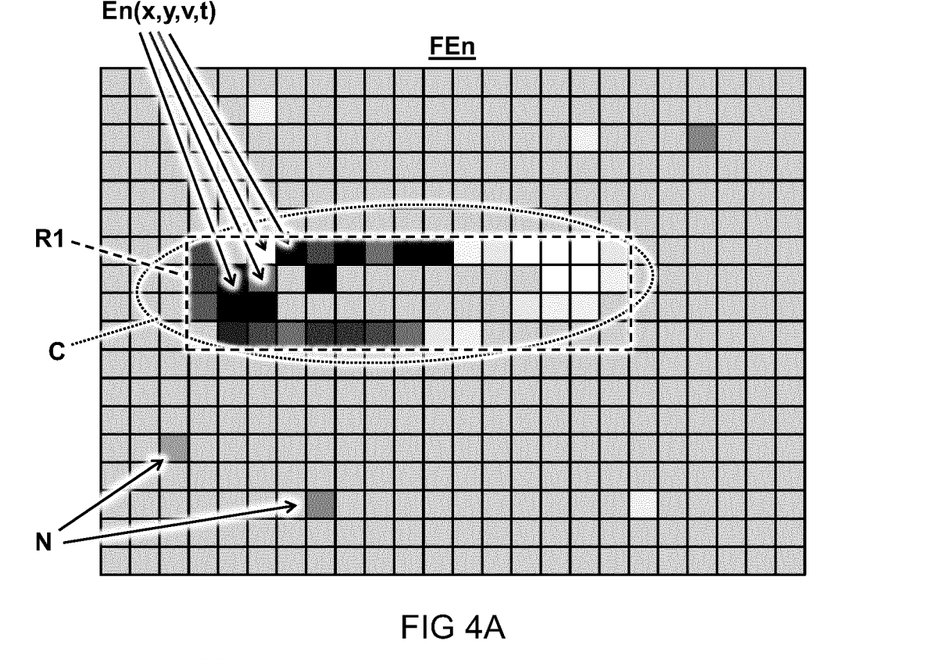
FIG. 4A illustrates general clustering of events.

FIG. 4A illustrates general clustering of events En. In a preferred embodiment, processing the frame event data FEn comprises determining a cluster C of events E. In some embodiments, a region interest R1 is determined based on a combination of multiple events determined to correspond to the same cluster. For example, the region of interest R1 may comprise a bounding box or other shape drawn to encompass some or all of the clustered events. In one embodiment, the events E are clustered based on a relative proximity in positional coordinates x,y of the events E. In some embodiments, events E that are adjacent or within a predetermined distance threshold are clustered together. For example, one or more isolated events N may be excluded from the clustering C. In other or further embodiments, clustering is based on relative values (v) of the events. For example, events representing relatively large change of pixel value between image frames are more likely to be included in the cluster than events representing relatively small change. In some embodiments, clustering is based exclusively on events representing an increase in pixel value (here shown as white). These events may represent a front of the object or location where an object is moving towards in the latest frame. In some embodiments, clustering is based exclusively on events representing a decrease in pixel value (here shown as black). These events may represent a back of the object or location where an object is moving away from. This may also be reversed, e.g. for a black object moving across a white background. In some embodiments, clustering is based on both events representing an increase and decrease in pixel value.

Figure 4B:
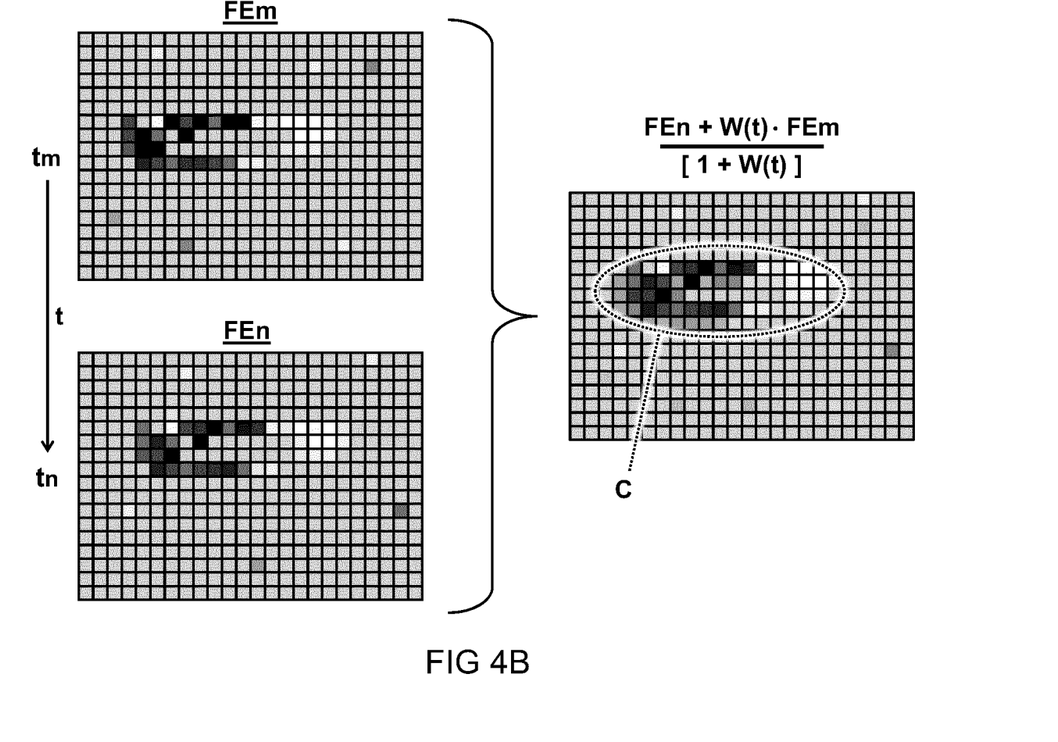
FIG. 4B illustrates clustering of events from different frame event data.

FIG. 4B illustrates clustering of events En from different frame event data FEm, FEn. In some embodiments, frame event data FEm generated based on a previous set of frames may be retained. For example, a tracker (such as shown in FIG. 1) may store one or more previous frame event data in a memory (not shown). In one embodiment, the previous frame event data FEm is combined with the current frame event data FEn to determine a clustering of events. In some embodiments, combining multiple event data sets may improve filtering of unrelated events or noise N. For example, event data sets can be combined by simply averaging the event values or taking a weighted average. In a preferred embodiment, the events are clustered based on a relative time tm, to of the events in a respective two or more sets of frame event data FEm, FEn. In some embodiments, e.g. as shown, previous frame event data FEm is multiplied by a respective weight factor W. The weight factor W may be unity to take a simple average, or less than one to represent a sort of decay of the previous event. In this way previous events may determine clustering of current events. In some embodiments, the weight factor W is dependent on time 't'. For example, the weight factor may decrease linearly or exponentially as a function of time (tn−tm) between the previous event and the current event. Accordingly, the frame event data of two, three, or more sets of subsequent frames in the sequence can be combined, each weighted according to the respective time of the events.

FIGS. 5A-5D illustrates clustering of events that are close in position (x,y) and/or time (t).

Figure 5A:
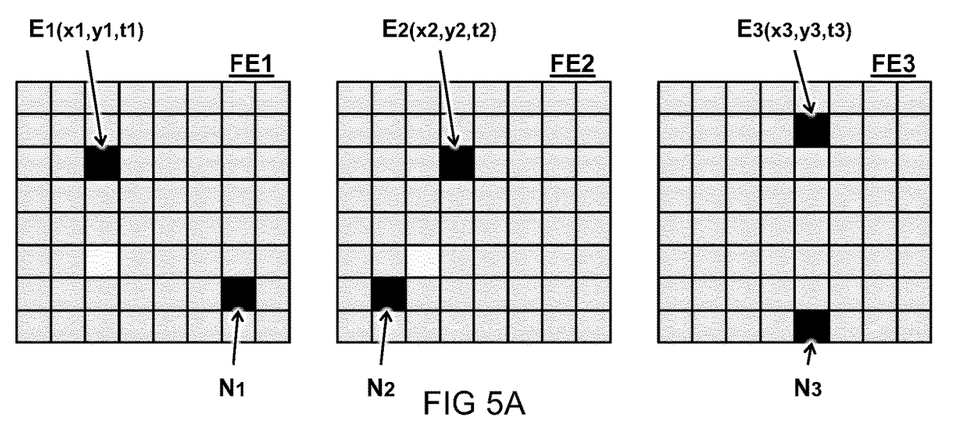
FIGS. 5A-5D illustrates clustering of events that are close in position and/or time.

FIG. 5A illustrates a first event E1 is registered at a first position x1,y1 and time t1; a second event E2 is registered at a second position x2,y2 and time t2; and a third event E3 is registered at a third position x3,y3 and time t3. As shown, one or more of each set of frame event data FE1,FE2,FE3 may comprise respective noise events N1,N2,N3 that may be uncorrelated in position and/or time. In some embodiments, such noise may be filtered by clustering events that are within a threshold time and/or position.

Figure 5B:
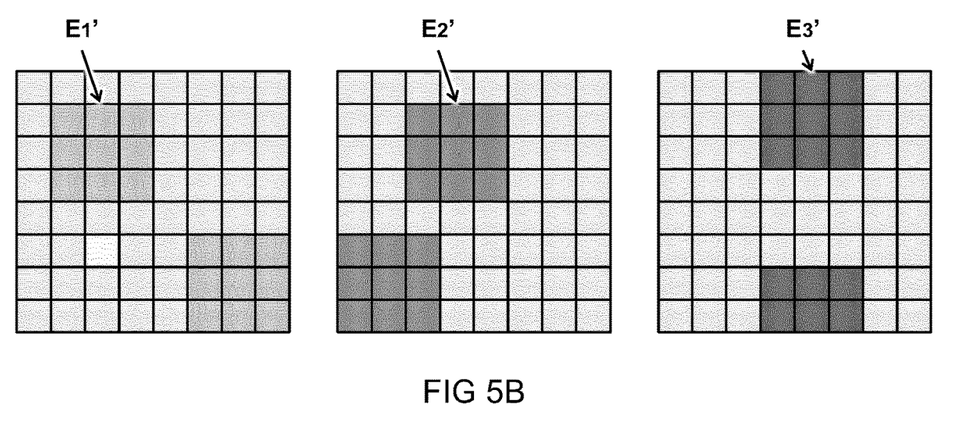

FIG. 5B illustrates weighting the values of the event E1-E3 and spreading the respective positions to encompass adjacent locations. While the spreading is here illustrated by including adjacent grid positions, a similar effect may be achieved by binning events together when they are within a threshold distance. In some embodiments, e.g. as shown, weighting of previous events may comprise applying a linear or exponential decrease to previous value values depending on the time since the previous event to the current event. In other embodiments (not shown), weighting of previous events may comprise application of a step function, e.g. simply averaging (full) values of events across two or more sets of frame event data. Also, other time dependent weighting can be used.

Figure 5C:
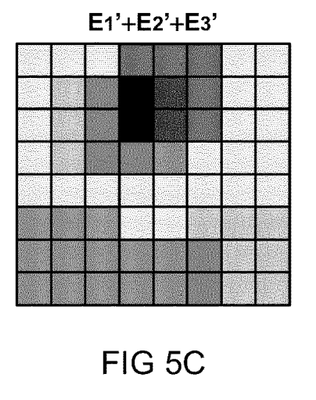
Figure 5D:
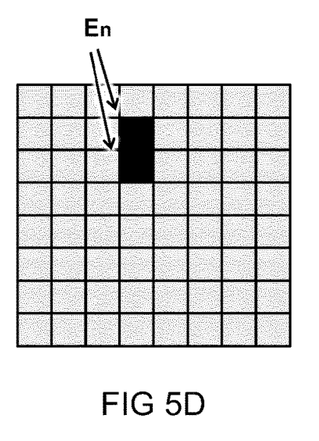

FIG. 5C illustrates combining the time-weighted and positional spread events to generate an activity map. FIG. 5D illustrates a filtered event En based on a threshold applied to the activity map. In some embodiments, a first event E1 is registered at a first position x1,y1 and first time t1, wherein a second event E2 is registered at a second position x2,y2 different from the first position, and a second time t2 different from the first time, wherein first and second events E1,E2 are binned together to generate a combined event based on a relative distance in both position and time between the first and second events, wherein a plurality of combined events are used to determine the region of interest R1. In one embodiment, an activity map is generated combining weighted values of at least the first and second events E1, E2 spread around to include additional locations around the registered positions x1, y1; x2, y2, wherein the region of interest R1 is determined based on the activity map. In another or further embodiment, the activity map is processed to generate filtered event data, wherein the region of interest R1 is determined based on a cluster of events in the filtered event data.

Some aspects relate to a computer-implemented method or system for classifying event data En. Some embodiments comprise processing the event data En to determine at least one region of interest R1. Other or further embodiments comprise determining region event data RE In based on the region of interest R1. Other or further embodiments comprise calculating at least one classification C1 based on the region event data RE1$n$. Preferably, processing the frame event data FEn comprises clustering of events based on their relative proximity in position x,y and time t, wherein the at least one region of interest R1 is determined based on a shape fitted to a respective cluster of events. For example, a bounding box or other shape is fitted to envelop at least a majority of the events in a respective cluster. For example, events within the region of interest may be processed for calculating the classification C1

In a preferred embodiment, the event data En is generated based on a comparison of frame image data FI representing image content of respective frames in a sequence SEQ of image frames. For example, the frame image data FI is received from a frame-based camera. In another or further embodiment, the event data En is received from an event-based sensor. Event-based sensors, such as cameras, have the potential to offer significant advantages over their standard counterparts, e.g. higher dynamic range and lower latency. The output of event-based sensors is typically composed of a sequence of asynchronous events which may complicate data processing. Furthermore, the output of an event-based sensor may be very sparse, e.g. carry information on only a small subset of its sensor elements. For example, an event-based camera does not output full size images at a fixed frame rate, but outputs events representing changes in pixel luminosity of only one or a few of its pixels, at the moment that the change is registered.

FIGS. 6A-6D illustrate various activity maps based on frame event data of one or more sets of frame event data. In one embodiment, an activity map is generated based on event values derived by subtracting pixel values of respective image frames in one or more sets of subsequent image frames. In this example, white color is used to indicate relative locations of respective events where the pixel value in the current image frame is higher than in the previous image frame (positive polarity). Black color is used to indicate relative locations events where the pixel value in the current image frame is lower than in the previous image frame (negative polarity). Gray color is used to indicate positions where no event is registered, e.g. where pixels in the subsequent image frames did not substantially change. Of course, it will be understood that the pictures shown are just a representation and the actual data can be much sparser. For example, it will be noted that the frame event data need only include positions of registered events while the majority of original pixel positions—gray area where no event was registered—need not be registered.

Figure 6A:
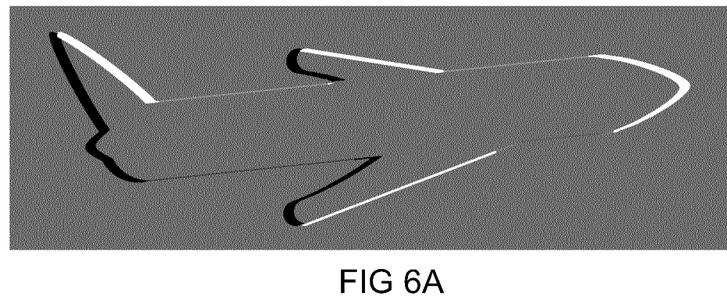
FIGS. 6A-6D illustrate various activity maps based on frame event data of one or more sets of frame event data.
Figure 6B:
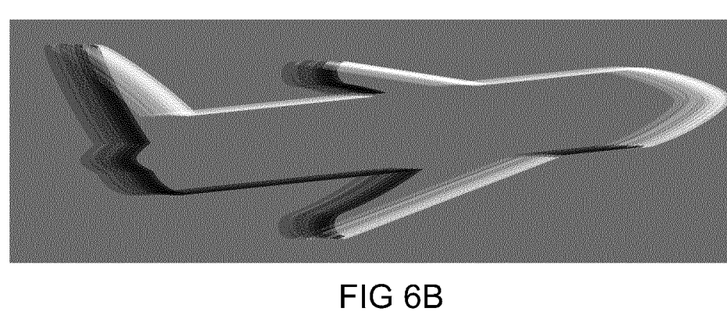
Figure 6C:
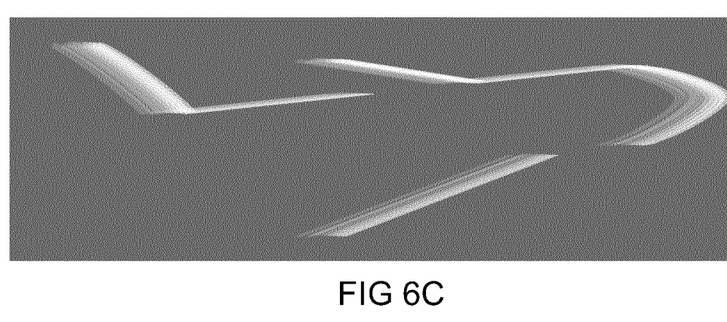
Figure 6D:
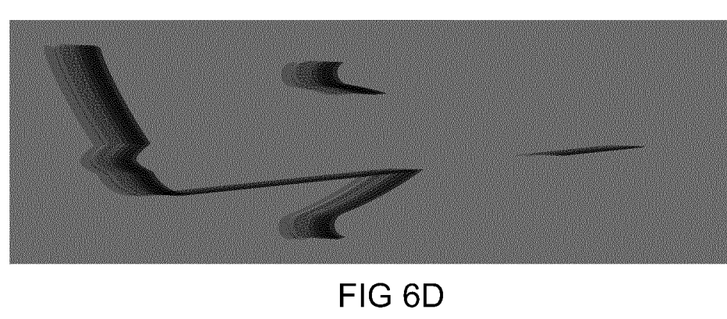

FIG. 6A illustrates an embodiment wherein an activity map is generated based on positive and negative polarity events between a single set of subsequent image frames. FIG. 6B illustrates an embodiment wherein an activity map is generated based on positive and negative polarity events between a multiple sets of subsequent image frames. It may be noted that the overlapping of multiple event maps corresponding to different times may improve distinction of a moving object. Here values of the respective event maps are also weighted as a function of time resulting in typical traces more clearly outlining the movement. By clustering the combined event maps, the recognition of relevant regions of interest around a respective object may be improved. FIGS. 6C and 6D are similar to FIG. 6B, except showing only events with positive polarity or negative polarity, respectively. By separately combining the different polarities, it can be prevented that the values of the polarities would cancel.

In a preferred embodiment, a first activity map is generated based on events having a positive polarity, wherein a second activity map is generated based on events having a negative polarity, wherein the polarity of the events indicates a positive or negative change of pixel value between a respective one or more pairs of subsequent image frames, wherein a first cluster of events is identified based on the first activity map, wherein a second cluster of events is identified based on the second activity map, wherein the region of interest R1 is determined based on a combination of the first and second clusters of events.

For the purpose of clarity and a concise description, features are described herein as part of the same or separate embodiments, however, it will be appreciated that the scope of the invention may include embodiments having combinations of all or some of the features described. For example, while embodiments were shown for converting frame-based sensor data to events, also alternative ways may be envisaged by those skilled in the art having the benefit of the present disclosure for achieving a similar function and result. E.g. the methods and systems for determining a region of interest based on event data may also provide advantages in combination with any event based sensor output. The various elements of the embodiments as discussed and shown offer certain advantages, such as reduced resource usage. Of course, it is to be appreciated that any one of the above embodiments or processes may be combined with one or more other embodiments or processes to provide even further improvements in finding and matching designs and advantages. It is appreciated that this disclosure offers particular advantages to processing image based data, and in general can be applied for any application wherein frame based data is processed by an event based classifier.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A computer-implemented method for classifying image content in a sequence of image frames, the method comprising:
    converting frame image data, representing an appearance of image content of the image frames, into frame event data defining a set of events, wherein the converting comprises determining, for each event of the set of events, a set of event parameters including positional coordinates corresponding to a location of a respective pixel in the image frames used to derive the event, and further including a respective value indicating at least one of an amount of change of the respective pixel or a polarity of the change based on comparison of values of the respective pixel between different image frames in the sequence of image frames;
    processing the set of event parameters of the frame event data to determine an event-based region of interest in the sequence of image frames; and
    calculating at least one classification based on an intersection of the event-based region of interest with the frame image data of an image frame in the sequence.

2. The method according to claim 1, wherein determining, during the converting of frame image data into frame event data, the set of event parameters for a current full frame of the sequence of image frames comprises:
    receiving the current full frame of the sequence of image frames;
    downscaling the current full frame to generate a current scaled frame; and
    comparing the current scaled frame to a previous scaled frame of a previous full frame to determine the set of event parameters of events in frame event data for the current full frame,
    wherein the positional coordinates of events based on the current scaled frame and the previous scaled frame are matched to corresponding pixel coordinates of pixels in the current full frame and the previous full frame to determine the event-based region of interest in the frame image data of the current full frame.

3. The method according to claim 2, wherein the calculating of the at least one classification comprises:
    retrieving a current full region from the current full frame based on the region of interest of the current full frame;
    scaling the current full region to generate a current scaled region; and
    calculating a classification of the region of interest based on the current scaled region of the current full frame.

4. The method according to claim 2, wherein the calculating of the at least one classification comprises:
    retrieving a current full region from the current full frame based on the determined region of interest of the current full frame;
    scaling the current full region to generate a current scaled region;
    comparing the current scaled region to a previous scaled region to generate region event data of the current full frame; and
    calculating a classification of the region of interest based on the region event data of the current full frame.

5. The method according to claim 1, wherein the determining of the event-based region of interest includes comparing downscaled image frames of respective full image frames, and
    wherein the calculating of the at least one classification is based on pixel values of at least one full image frame of the respective full image frames in a correspondingly scaled region of interest.

6. The method according to claim 1, wherein the event-based region of interest is determined from frame event data based on a first set of image frames in the sequence, the method further comprising extrapolating a position of the event-based region of interest to intersect with one or more other frames that follow the first set of image frames in the sequence.

7. The method according to claim 1, wherein the processing of the set of event parameters of the frame event data comprises determining a cluster of events that are clustered based on:
    a relative proximity of positional coordinates of the events, and
    a relative time of the events in a respective two or more sets of frame event data,
    wherein events that are adjacent or within a predetermined distance and time threshold are clustered together,
    wherein the region of interest is determined based on a combination of multiple events determined to correspond to the same cluster, and
    wherein the region of interest comprises a shape to encompass at least a majority of the clustered events.

8. The method according to claim 1, wherein a previous frame event data is multiplied by a respective weight factor,
    wherein the respective weight factor decreases as a function of time between a previous event of the previous frame event data and a current event of current frame event data,
    wherein frame event data of multiple image frames in the sequence of image frames are combined, and
    wherein frame event data of each of the multiple image frame is weighted according to respective times of the image frames.

9. The method according to claim 1, wherein a first event is registered at a first position and first time,
    wherein a second event is registered at:
    a second position different from the first position, and
    a second time different from the first time,
    wherein the method further comprising binning the first event and the second event together to generate a combined event based on a relative distance in both position and time between the first event and the second event, and
    wherein a plurality of combined events are used to determine the region of interest.

10. The method according to claim 9, comprising:
    generating an activity map combining weighted values of at least the first event and the second event spread around to include additional locations around the first position and the second position,
    wherein the region of interest is determined based on the activity map,
    wherein the activity map is processed to generate filtered event data, and
    wherein the region of interest is determined based on a cluster of events in the filtered event data.

11. The method according to claim 10, comprising:
- generating a first activity map based on events having a positive polarity,
- generating a second activity map based on events having a negative polarity,
- wherein polarity of an event indicates a positive change or a negative change of pixel value between a respective one or more pairs of image frames of the sequence of image frames,
- wherein a first cluster of events is identified based on the first activity map,
- wherein a second cluster of events is identified based on the second activity map, and
- wherein the region of interest is determined based on a combination of the first cluster of events and the second cluster of events.

12. The method according to claim 1, wherein the frame image data of an image frame, of the sequence of image frames, comprises information determining an appearance of each pixel in one of either a full image frame or a downscaled frame of the image frame,
- wherein each pixel is defined by respective values for one or more channels, and
- wherein the frame image data comprises image content representing one or more objects to be classified.

13. The method according to claim 1, wherein the sequence of image frames is received as a set of full size images generated at a fixed frame rate by an image-based sensor device.

14. A computer-implemented method for classifying event data, the method comprising:
- converting image data, representing an appearance of image content of image frames of a sequence of image frames, into the event data, wherein the event data comprises events and the converting comprises determining, for each event of the event data, a set of event parameters including positional coordinates corresponding to a location of a respective pixel in the image frames used to derive the event, and further including a respective value indicating at least one of an amount of change of the respective pixel or a polarity of the change based on comparison of values of the respective pixel between different image frames in the sequence of image frames;
- processing the event data to determine at least one region of interest;
- determining region event data based on the at least one region of interest; and
- calculating at least one classification based on the region event data;
- wherein processing the event data comprises clustering of events based on their relative proximity in position and time, wherein the at least one region of interest is determined based on a shape fitted to a respective cluster of events.

15. The method according to claim 14, wherein the sequence of image frames is received as a set of full size images generated at a fixed frame rate by an image-based sensor device.

16. The method according to claim 14, wherein the events are clustered based on:
- a relative proximity in positional coordinates of the events, and
- a relative time of the events in a respective two or more sets of event data,
- wherein events that are adjacent or within a predetermined distance and time threshold are clustered together,
- wherein the region of interest is determined based on a combination of multiple events determined to correspond to the same cluster, and
- wherein the region of interest comprises a shape to encompass at least a majority of the clustered events.

17. The method according to claim 14, wherein previous event data is multiplied by a respective weight factor, wherein the weight factor decreases as a function of time between a previous event of the previous event data and a current event of current event data, wherein subsequent events are combined, each weighted according to respective times of the events.

18. A non-transitory computer-readable medium storing instructions that, when executed by one or more processors, cause a device to perform a method for classifying image content in a sequence of image frames comprising:
- converting frame image data, representing an appearance of image content of the image frames, into frame event data defining a set of events, wherein the converting comprises determining, for each event of the set of events, a set of event parameters including positional coordinates corresponding to a location of a respective pixel in the image frames used to derive the event, and further including a respective value indicating at least one of an amount of change of the respective pixel or a polarity of the change based on comparison of values of the respective pixel between different image frames in the sequence of image frames;
- processing the set of event parameters of the frame event data to determine an event-based region of interest in the sequence of image frames; and
- calculating at least one classification based on an intersection of the event-based region of interest with the frame image data of an image frame in the sequence.

19. The non-transitory computer-readable medium according to claim 18, wherein determining, during the converting of frame image data into frame event data, the set of event parameters for a current full frame of the sequence of image frames comprises:
- receiving the current full frame of the sequence of image frames;
- downscaling the current full frame to generate a current scaled frame; and
- comparing the current scaled frame to a previous scaled frame of a previous full frame to determine the set of event parameters of events in frame event data for the current full frame,
- wherein the positional coordinates of events based on the current scaled frame and the previous scaled frame are matched to corresponding pixel coordinates of pixels in the current full frame and the previous full frame to determine the event-based region of interest in the frame image data of the current full frame.

20. The non-transitory computer-readable medium according to claim 19, wherein the calculating of the at least one classification comprises:
- retrieving a current full region from the current full frame based on the determined region of interest of the current full frame;
- scaling the current full region to generate a current scaled region;
- comparing the current scaled region to a previous scaled region to generate region event data of the current full frame; and calculating a classification of the region of interest based on the region event data of the current full frame.

\* \* \* \* \*